United States Patent
Astner et al.

(10) Patent No.: US 9,429,192 B2
(45) Date of Patent: Aug. 30, 2016

(54) INTERLOCKING BEARING

(71) Applicant: GGB, Inc., Thorofare, NJ (US)

(72) Inventors: Bernd Astner, Leverkusen (DE);
Andreas Keilbach, Malsch (DE);
Herbert Sautter, Schwaigern (DE);
Adrian John Hardgrave, Annecy (FR)

(73) Assignee: GGB, Inc., Thorofare, NJ (US)

( * ) Notice: Subject to any disclaimer, the term of this patent is extended or adjusted under 35 U.S.C. 154(b) by 0 days.

(21) Appl. No.: 14/426,222

(22) PCT Filed: Aug. 22, 2013

(86) PCT No.: PCT/US2013/056245
§ 371 (c)(1),
(2) Date: Mar. 5, 2015

(87) PCT Pub. No.: WO2014/039277
PCT Pub. Date: Mar. 13, 2014

(65) Prior Publication Data
US 2015/0226259 A1     Aug. 13, 2015

(30) Foreign Application Priority Data
Sep. 6, 2012 (EP) .................................... 12006306

(51) Int. Cl.
*F16C 17/02* (2006.01)
*F16C 43/02* (2006.01)
(Continued)

(52) U.S. Cl.
CPC .............. *F16C 33/046* (2013.01); *F16C 17/02* (2013.01); *F16C 17/10* (2013.01); *F16C 33/20* (2013.01);
(Continued)

(58) Field of Classification Search
CPC ...... F16C 17/02; F16C 17/10; F16C 33/046; F16C 33/201; F16C 33/208; F16C 43/02; F16C 2226/74; F16C 2226/78; F16C 33/08
USPC .......................... 384/275–276, 282, 295–297
See application file for complete search history.

(56) References Cited

U.S. PATENT DOCUMENTS 1,884,380 A * 10/1932 Tenney ..................... F16H 3/04
74/332
2,308,183 A * 1/1943 Lewis ..................... F16K 41/10
251/335.5

(Continued)

FOREIGN PATENT DOCUMENTS

AT      508186 A1   11/2010
DE    2108358 A1    9/1972

(Continued)

OTHER PUBLICATIONS

Extended European Search Report for European Patent Application No. 12006306.0, dated Dec. 21, 2012. 7 pages.

(Continued)

*Primary Examiner* — Marcus Charles
(74) *Attorney, Agent, or Firm* — Perkins Coie LLP

(57) ABSTRACT

A modular plain bearing is provided. The modular plain bearing includes a first end portion having a terminal edge with a plurality of first fingers and a second end portion having a terminal edge with a plurality of second fingers. The plurality of fingers cooperatively engage to provide a snap fit connection between the parts. For longer plain bearings, a bearing extender is provided. The bearing extender includes at least a first connector having a plurality of first connector fingers. The bearing extender may include either a second connector opposite the first connector having a plurality of second connector fingers.

17 Claims, 5 Drawing Sheets

(51) Int. Cl.
  *F16C 33/08* (2006.01)
  *F16C 33/04* (2006.01)
  *F16C 17/10* (2006.01)
  *F16C 33/20* (2006.01)
(52) U.S. Cl.
  CPC ............. *F16C 33/208* (2013.01); *F16C 43/02* (2013.01); *F16C 33/08* (2013.01); *F16C 2226/74* (2013.01); *F16C 2226/78* (2013.01)

(56) References Cited

U.S. PATENT DOCUMENTS

| | | | | |
|---|---|---|---|---|
| 2,547,374 | A | * | 4/1951 | Carideo .................. F01C 1/063 418/104 |
| 2,568,614 | A | * | 9/1951 | Fields ..................... D06F 13/02 68/110 |
| 3,972,576 | A | | 8/1976 | Hill |
| 4,230,194 | A | * | 10/1980 | Logan, Jr. ............. E21B 10/006 175/336 |
| 5,192,137 | A | | 3/1993 | Renard |
| 5,775,741 | A | * | 7/1998 | Rice ..................... E04H 4/1663 15/1.7 |
| 6,086,327 | A | | 7/2000 | Mack et al. |
| 6,107,694 | A | * | 8/2000 | Mostrom .......... B60R 25/02156 180/287 |
| 7,469,673 | B2 | * | 12/2008 | Wagner .................. F01C 9/005 123/18 R |
| 2002/0114661 | A1 | * | 8/2002 | Bohne ................ F16C 11/0614 403/141 |
| 2004/0116945 | A1 | * | 6/2004 | Sharkawy .......... A61B 17/0643 606/153 |
| 2009/0110338 | A1 | * | 4/2009 | Blase ..................... F16C 33/08 384/296 |
| 2010/0150490 | A1 | * | 6/2010 | Cymbal .................. F16C 33/60 384/569 |
| 2011/0155006 | A1 | * | 6/2011 | Pratt ..................... B41F 27/105 101/351.7 |

FOREIGN PATENT DOCUMENTS

| | | | | |
|---|---|---|---|---|
| DE | 10202057 A1 | * | 7/2003 | ............. B41F 27/10 |
| GB | EP 0658700 A2 | * | 6/1995 | ............ F16F 9/0245 |
| KR | 20-1996-0002648 Y1 | | 3/1996 | |

OTHER PUBLICATIONS

International Search Report and Written Opinion for International Patent Application No. PCT/US13/56245, dated Nov. 22, 2013. 12 pages.

* cited by examiner

INTERLOCKING BEARING

CROSS REFERENCE TO RELATED APPLICATIONS

This application is a U.S. National Stage of International Patent Application No. PCT/US13/56245, filed Aug. 22, 2013, which claims the benefit of European Patent Application Number 12006306.0, filed Sep. 6, 2012, each of which is incorporated herein by reference in its entirety.

The technology of the present application relates generally to polymer bearings, and more specifically, to a double-flanged, single-flanged, or un-flanged plain bearing having an interlocking body assembly to facilitate assembly and production thereof.

BACKGROUND

Plain bearings made using a variety of materials adapted with fillers to provide improved wear resistance and/or reduced friction characteristics are well known in the industry. These bearings may take the form of a simple cylinder, or may have a flange on one end to aid location in the housing and/or provide a thrust washer surface. Certain applications require a double flanged bearing so that the bearing is securely located in a cylindrical housing and/or to provide thrust washer surfaces at each side of the housing.

As can be appreciated, adding a flange to one or both sides of the cylindrical bearing may increase the complexity of both manufacture of the bearing and installation of the bearing.

With reference to, for example, a conventional double flange bearing, it can be appreciated the double flange bearing is more difficult to make than a simple cylinder bearing or a cylinder with a single flange bearing form. Polymer bearings can, for example, require complex and expensive multi-part tooling for the Injection Moulding Machine to produce a single part double flanged bearing, or to produce a single part bearing which can be compressed or manipulated in such a way as to pass through the housing before the second flange is formed. Other known methods of production include a design of housing which can be assembled around the double flanged bearing, or a bearing which allows assembly into the housing in multiple parts to create a double flanged bearing.

European Patent EP 1 869 334 owned by igus GmbH provides a unique double flange bearing where the second flange is formed by bending a plurality of collar elements from a flat position where the collar elements are co-planar with the cylindrical bearing to a flange position where the collar elements are perpendicular to the plane of the cylindrical bearing. The bending of the collar elements has a number of deficiencies, however. One exemplary deficiency is the bend location may cause a stress concentration or potential fracture point in the bearing. Another exemplary deficiency is the difficulty in bending the collar elements to name but two exemplary deficiencies.

Moreover, long polymeric cylindrical bearings, whether flangeless, single flange, or double flange, are difficult to make conventionally. As is generally known in the art, long polymeric molds require significant, large tooling to accommodate the length of the bearing. Additionally, the mold may require several injection gates along the tooling for the mold, making the manufacture of long cylindrical plain bearings complex. The multiple gates and long tool also may lead to problems with filling the mold. The long mold with multiple injections may result in the polymer cooling to inhibit proper knitting of the material along a joint or weld point, sometimes referred to as cold welding resulting in some weakness in the bearing material.

With the above in mind, there is need in the industry for a double, single, or non/un-flanged plain polymer bearing that may be formed using conventional injection molding techniques but not suffer the deficiencies of which a few are outlined above.

BRIEF SUMMARY

The present application addresses the above stated needs by providing a modular bearing. The invention provides a modular bearing including at least a first and second end portion. The first and second end portions are provided with a plurality of fingers at an edge thereof. The plurality of fingers are shaped to cooperatively engage in a snap fit connection.

In certain embodiments, the plurality of fingers are chamfered to facilitate the relative movement of the plurality of fingers as they cooperatively engage.

In certain embodiments, at least one of the first and second end portions comprises a radially extending flange that has external and internal surfaces. The surfaces may function as a thrust bearing surface or washer. In certain aspects of the technology, at least one of the first and second end portions may comprise a terminal wall rather than a flange. This provides for options to form a double flange bearing, a single flange bearing, or a zero flange bearing.

In an embodiment of the present application, a bearing extender is provided. The bearing extender has a first connector part and a second connector part opposite the first connector part. The first and second connector parts are provided with a plurality of fingers. The plurality of fingers cooperatively engage the plurality of fingers of the first and second end to allow for a longer plain bearing to be formed of multiple parts in a modular fashion.

In another embodiment, the end portions and bearing extenders are formed of a polymer or composite material. The end portions may be formed by injection molding. In other aspects, the end portions and bearing extenders are formed of a non-polymeric material, such as a metal or metal alloy. In certain embodiments, the end portions and the bearing extenders may be formed of different material selected for desirable characteristics, such as, for example, wear resistance and/or lubricous surfaces.

In further embodiments, the plurality of fingers are provided symmetrically about the edges. In other embodiments of the technology of the present application, the plurality of fingers are provided asymmetrically.

In other embodiments, the end portions and the bearing extenders form a constant shape. In certain embodiments, the constant shape may be a cylindrical shape. In other embodiments, the end portions and the bearing extenders may include tapers, steps, curvatures, or bulges.

BRIEF DESCRIPTION OF THE DRAWINGS

The technology of the present application will be explained in connection with the appended non-limiting and non-exhaustive drawings, wherein.

The technology of the present patent application will now be explained with reference to various figures, tables, and the like. While the technology of the present application is described with respect to a plain double flange cylindrical bearing, one of ordinary skill in the art would now recognize that the technology is applicable to other types of injection molded, long polymer bearings including flange and un-flange bearing types. Moreover, the technology of the present patent application will be described with reference to certain exemplary embodiments herein. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein.

Figure 5A:
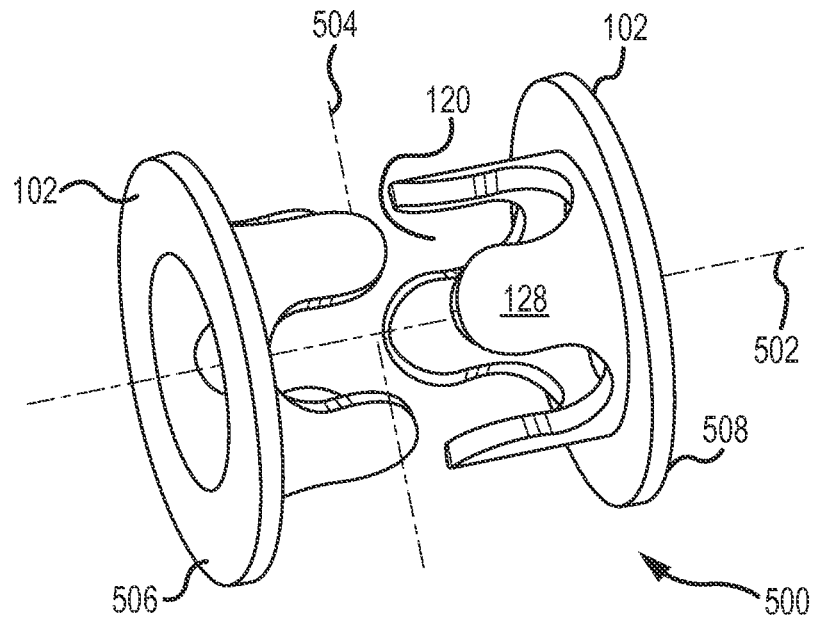
FIG. 5A is a perspective exploded view of a plain cylindrical double flange bearing consistent with the technology of the present application.

The technology of the present application will now be explained with reference to the figures. The technology, as shown in the figures, provides for a double flange plain cylindrical bearing but could be used for other injection molded bearings or the like. The technology relates in general to a plain polymer bearing designed as a plurality of modular pieces that can be produced in a simple cavity injection molding tool. The modular nature of the pieces allows the polymer bearing to be assembled into a housing from multiple parts using an interlocking feature and assembly system to produce a plain polymer bearing of the desired geometry. Exemplary embodiments of the modular polymer bearing 500 and 600 are shown exploded in FIGS. 5A and 6A and assembled in FIGS. 5B and 6B. The modular polymer bearings 500 and 600 each have a longitudinal axis 502, 602 and a transverse axis 504, 604. As will be explained further below, modular polymer bearings 500, 600 have first and second radially extending flanges 506, 606, 508, 608 on opposite sides of the modular polymer bearings. Other configurations are possible, including for example, longer barrels, single or un-flanged bearings, or the like.

Plain bearings 500 and 600 may be made using a variety of materials adapted with fillers or the like to provide increased wear resistance and or decreased frictional characteristics. In other words, the plain bearings may be formed from hard and lubricous composites such as thermosets, thermoplastics, and metals as well as combinations thereof and the like. The composites are formed into bearings that may have a simple cylinder and one or more flange surfaces that cooperates with the cylinder to form a thrust bearing or washer surface. In certain embodiments, the plain bearing may include a double flange bearing, which has a flange surface on both sides of the plain bearing as shown in FIGS. 5A, 5B, 6A, and 6B. The double flange bearing may facilitate locating the cylindrical bearing surface properly and/or provide a thrust surface at each side of the bearing. As will be explained further below, the mechanical nature of the interlocking of the modular pieces allows for the different pieces to be formed of different materials.

As can be appreciated, conventionally, it is difficult to make a workable double flange cylindrical bearing especially as the barrel lengthens. The modular design of the technology of the present application provides polymer bearings that may be formed by rapid prototyping constructions using liquid resins, casting pours of liquid polymers, overmolding, and even machining of polymer bushings to make the interlocking feature of the modular bearing design associated with the technology of the present application.

Figure 1A:
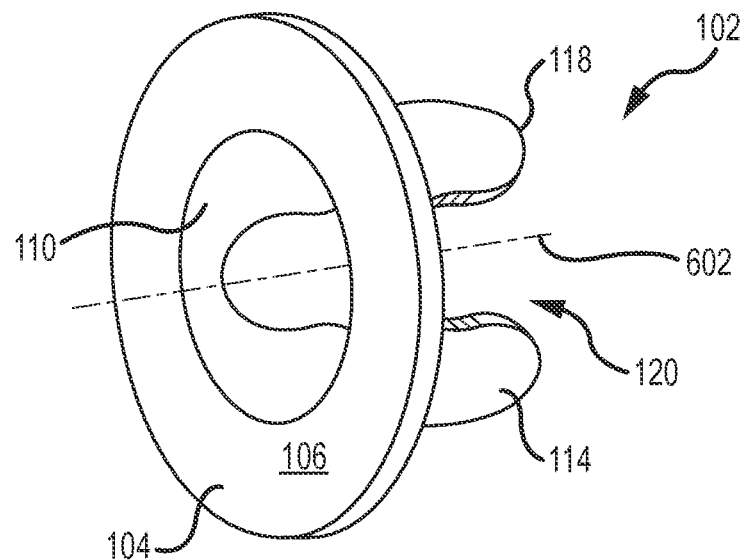
FIG. 1A is a first perspective view of a first part of a plain cylindrical flanged bearing consistent with the technology of the present application.
Figure 1B:
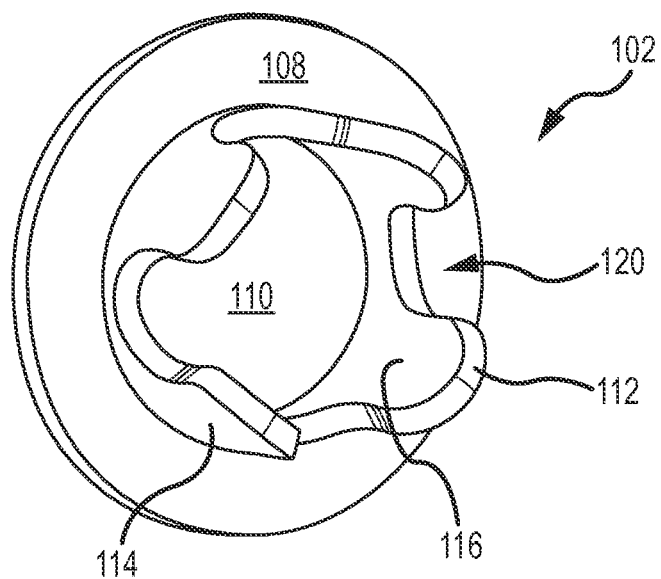
FIG. 1B is second perspective view of the first part of the plain cylindrical flanged bearing of FIG. 1A.
Figure 3:
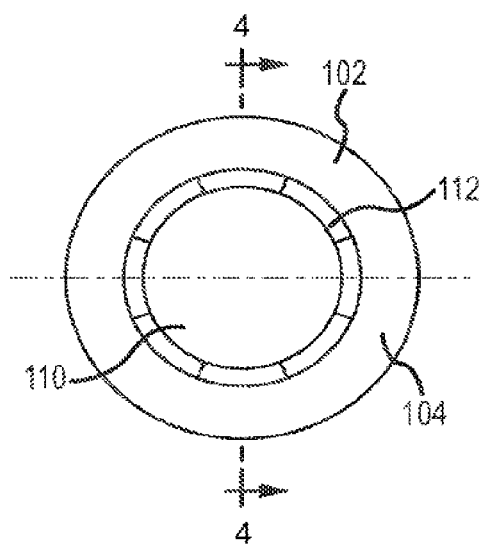
FIG. 3 is a plan view from the finger end of the first part of the plain cylindrical flanged bearing of FIG. 1A.
Figure 4:
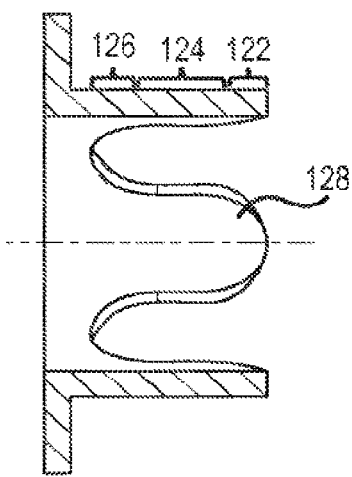
FIG. 4 is a cross sectional view of the first part of the plain cylindrical flanged bearing of FIG. 3 taken along line 4-4.

With reference now to FIG. 1A, a first part or end portion 102 of a plain bearing is provided, such as may be used with plain bearings 500 and 600. The first part or end portion 102 includes a radially extending flange 104 that extends radially outward from the longitudinal axis 602. The flange surface 104 has an external surface 106 and an internal surface 108. Either surface may function as a thrust washer surface depending on the location and application of the surface. The radially extending flange 104 provides a bore 110 extending from the external to the internal surface (FIG. 3). As best seen in FIG. 1B, extending parallel to the longitudinal axis 602 is a bearing wall 112 having an internal side 116, which may be called the bearing surface, and an external side 114 opposite the internal side 116. The bearing wall is operatively coupled to the internal surface 108 and generally frames the bore 110. The bearing wall 112 terminates at an end portion edge 118, which may be chamfered as will be explained further below. The bearing wall 112 includes a number of voids 120 extending from the end portion edge 118 toward the internal surface 108. The voids 120 generally have a neck portion 122, a throat portion 124, and a terminal portion 126 as best seen in FIG. 4. The void 120 is formed by a curvature from the neck portion 122 through the throat portion 124 to the terminal portion 126. Providing the voids 120 in the bearing wall 112 forms a plurality of fingers 128 or the like that are movable/flexible in relation to the flange 104.

Figure 5B:
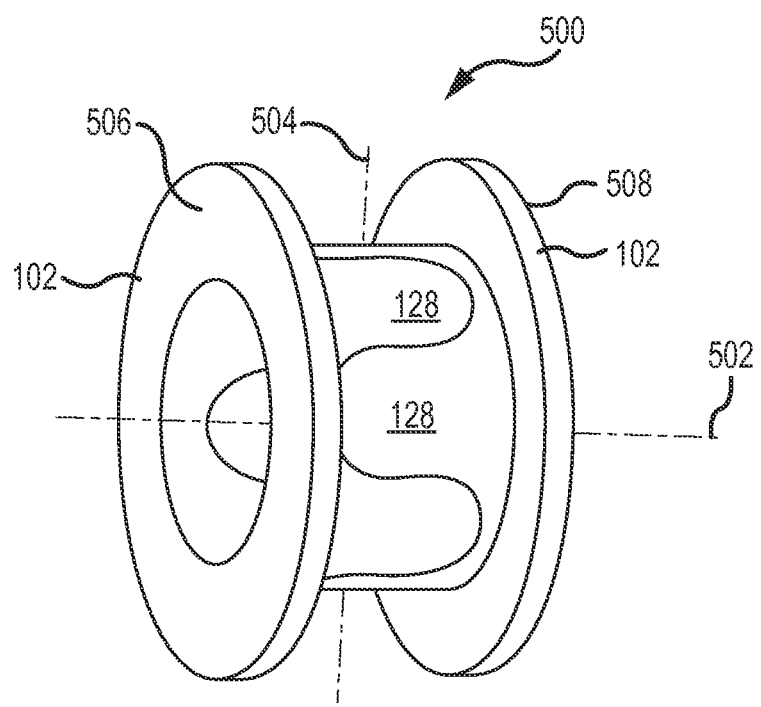
FIG. 5B is a perspective non-exploded view of a plain cylindrical double flange bearing shown exploded in FIG. 5A.
Figure 6A:
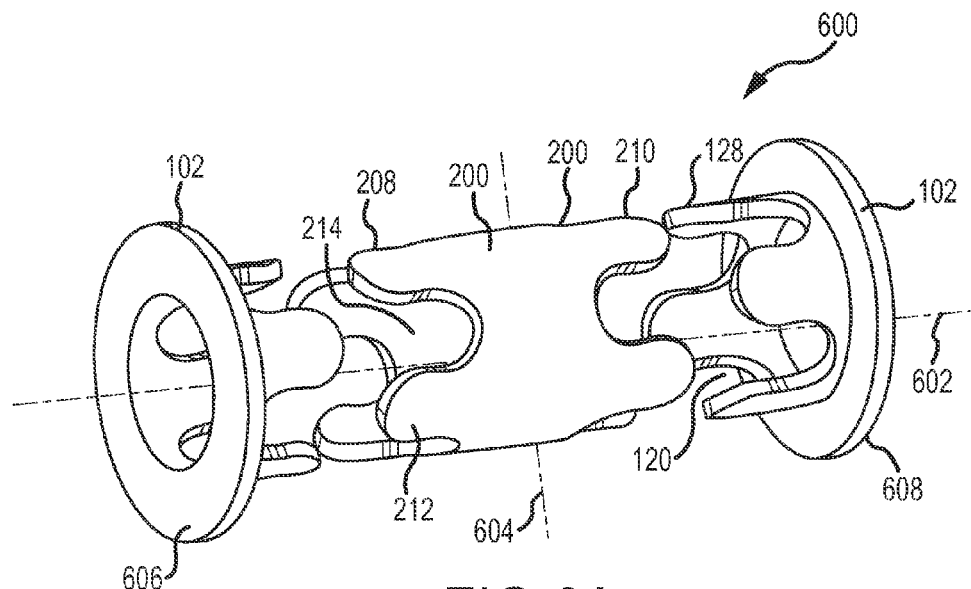
FIG. 6A is a perspective exploded view of a plain cylindrical double flange bearing consistent with the technology of the present application.
Figure 6B:
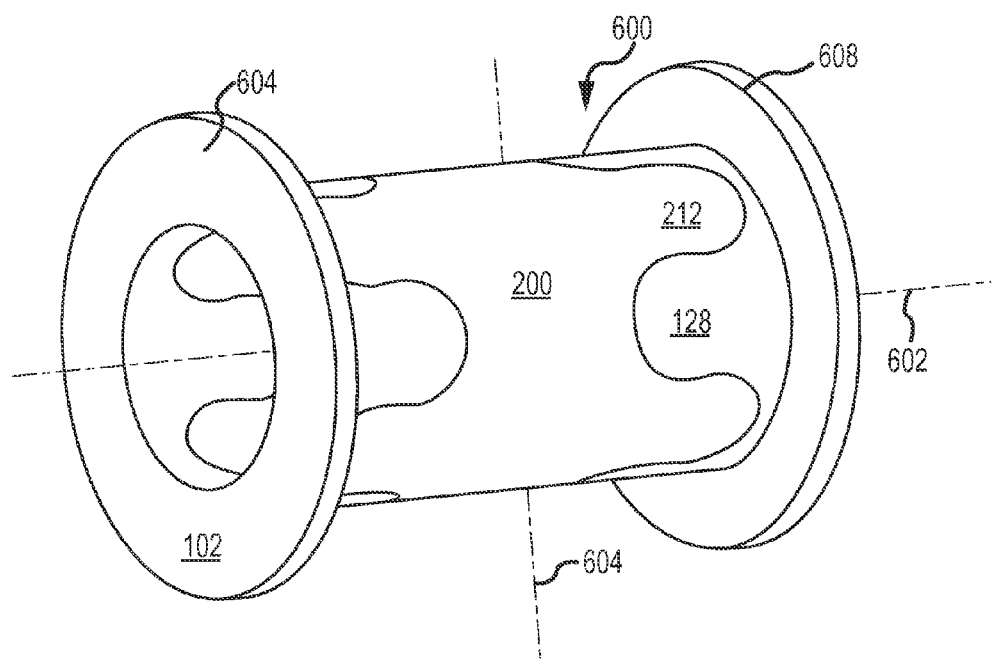
FIG. 6B is a perspective non-exploded view of a plain cylindrical double flange bearing shown exploded in FIG. 6A.

As can be appreciated, two first parts or end portions 102 may be modularly linked as shown in FIG. 5B by rotating the first parts with respect to each other such that each void 120 is aligned with a corresponding finger 128. Pushing the first parts or end portions 102 together causes the fingers 128 to interlock. Because the first parts or end portions 102 are identical, a single mold or cavity is usable in the injection mold process to make the end portions 102. However, it should be noted that the first parts or end portions 102 need not be identical such that different shaped or length bearings may be made. As mentioned, the first part edge 118 may be chamfered to facilitate the fingers 128 flexing and moving next to each other to interlock in the snap fit engagement. To increase pull out strength, the voids 120 (or, conversely, the fingers 128) may be formed with a pinched neck portion 112 and a flared or widening throat portion 124.

Figure 2:
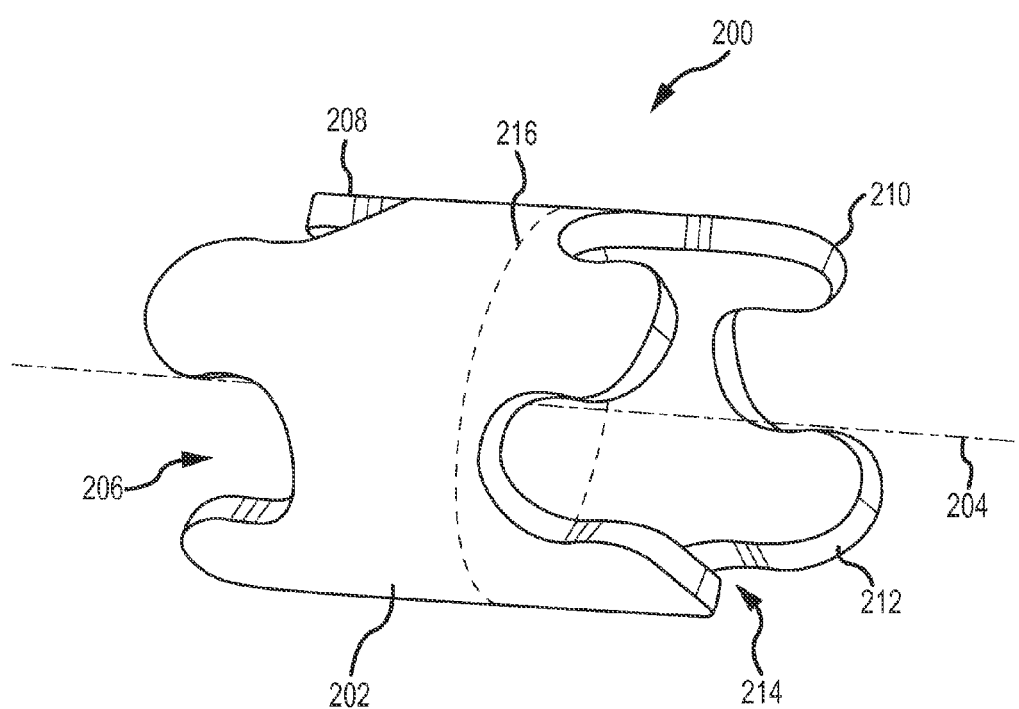
FIG. 2 is a perspective view of a second part of a plain cylindrical flanged bearing consistent with the technology of the present application.

A bearing extender 200 is shown in FIG. 2. The bearing extender 200 may be referred to as a barrel or cylinder in the present exemplary embodiments. The bearing extender 200 has a bearing wall 202 that extends parallel to the longitudinal axis 204 and is formed to be substantially co-planar with the bearing wall 112 of first part 102. The bearing wall 202 is cylindrical and forms a bore 206 that aligns with a bore 110 of first part 102. As shown, bearing extender 200 has a first connector portion 208 on one end of the bearing wall 202 and a second connector portion 210 on an opposite end of the bearing wall 202. First and second connector portions 208, 210 are formed with a plurality of fingers 212 and voids 214 to cooperatively engage the voids 120 and fingers 128 of the first parts 102. One or more bearing extenders 200 may be fitted between a pair of first parts 102 to form long cylinder plain bearings. Also, for a single flanged bearing, the bearing extender 200 may terminate in a terminal wall 216, as shown in phantom, rather than a second connector portion 210 as shown. An un- or non-flange bearing may be formed by snap fitting two bearing extenders 200 with terminal walls 216 together.

With reference back to FIGS. 5A, 5B, 6A, and 6B, a double flange bearing 500 and a double flange extended bearing 600 is shown in additional detail. The double flange bearing 500 provides for first end portion 102 and a second end portion 102 that are snap fit together. The double flange extended bearing has the first and second end portions 102 snap fit to the first and second connectors 208, 210 of the bearing extender 200. Notice, longer extended bearings 600 may be provided by providing a plurality of bearing extenders 200 between the first parts 102. When a single flange bearing is desired, the second end portion 102 may be replaced by a bearing extender 200 having a terminal wall 216. In this embodiment, the bearing extender 200 may be called the second end portion or the like for clarity.

While the figures and description herein provide for fingers and voids having a particular shape to allow for relative movement and flex, one of ordinary skill in the art will now recognize on reading the disclosure that alternative shapes are possible providing the ends and extenders are capable of interlocking in a snap fit arrangement. Also, while shown with the bearing wall 112 and 202 having surfaces generally parallel with the longitudinal axis, one or more of the bearing walls 112, 202 may have a tapering surface to allow for dimensional differences along the wall. Instead of a taper, the bearing walls 112, 202 may rather have a step feature to increase or decrease the diameter of the bore or the like. Also, while shown as a cylindrical shape, the first parts 102 and extenders 200 may form other geometric shapes including, for example, frustoconical, ovoid, elliptical, or other polygonal shapes as the part may demand.

An aspect of the technology of the present application is that the provided plain bearings 500, 600 and the like can be pushed together and pulled apart very easily when un-housed or in free space. Moreover, the parts may be assembled in a housing by inserting the parts into the housing and pushing the parts together to interlock relatively easily. However, and unexpectedly, once formed internal to the housing, the bearings 500 and 600 are nearly impossible to pull apart without destroying the bearing assembly. Where a double flanged bearing is used, the bearing is effectively permanently mounted. Single- or un-flanged bearings also cannot be pulled apart when housed, but the bearings can be pushed through the housing and easily dismantled when un-housed. This design feature operates because the interlocking shapes flex over each other when pushed together, but need to be able to move in the direction of the outside diameter of the bearing when being pulled apart. Once the bearing parts have been inserted and interlocked, the housing constrains movement in this direction. This is seen as being a useful design feature since it prevents the bearing from falling out during subsequent assembly procedures.

Another aspect of the technology of the present application is that the edges of the fingers (or voids) provide self-alignment or orientation of the parts. That is when the first parts 102 and/or extenders 200 are placed and allowed to freely rotate about the longitudinal axis, the parts may rotate slightly as the interlocking shapes touch each other and slide into the interlocking position. This has the advantage that the parts do not need to be orientated specifically with regard to each other on assembly so that they can self-align into the correct orientation.

The shape and size of the curves necessary to perform the interlock can now be calculated readily depending on the width and diameter of the bearing required. Moreover, the interlocks do not need to be completely rigid. Rather, they may provide for some sideward movement between the parts along the bearing length when housed. This design modification can be used when the design calls for a relatively wide variation in housing lengths.

Also, because the connection is mechanical in nature, the first parts and extenders can be formed of different materials. This allows providing for materials of different wear and friction characteristics; for example, where an application has a high edge loading on the bearing, the end parts could be made from a material suitable for wear resistance, and the extension parts could be made from a lower friction but less wear resistant material The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A flanged modular plain bearing, comprising:
  a first end portion having a longitudinal axis and a transverse axis, the first end portion comprising a radially extending flange with an external surface and an internal surface and a bearing wall that extends from the internal surface to a first end portion edge, the first end portion having a plurality of first fingers proximate the first end portion edge;
  a second end portion releasably coupled to the first end portion, the second end portion having a longitudinal axis and a transverse axis, the second end portion comprising a bearing wall that extends from a first end to a second end portion edge, the second end portion having a plurality of second fingers proximate the second end portion edge; and
  one or more bearing extenders disposed between the first and second portions, each bearing extender comprising a first connector portion and a second connector portion opposite the first connector portion, the first and second connector portions comprising a plurality of first and second connector fingers that cooperatively engage the plurality of first and second fingers of the first and second end portions in a snap fit; wherein the plurality of first and second fingers extend along the longitudinal axis and are chamfered at the first and second end portion edges, such that when pushed together during assembly, the first and second fingers are flexed and move over one another in a transverse direction to cooperatively engage in a snap fit.

2. The flanged modular plain bearing of claim 1, wherein the second end portion further comprises a radially extending flange at said first end.

3. The flanged modular plain bearing of claim 1, wherein the second end portion further comprises a terminal wall.

4. The flanged modular plain bearing of claim 1, wherein the first end portion and the second end portion are identical.

5. The flanged modular plain bearing of claim 1, wherein the first end portion and the second end portion are non-identical.

6. The flanged modular plain bearing of claim 1, wherein the first end portion comprises a bore.

7. The flanged modular plain bearing of claim 1, wherein the bearing extender forms a cylindrical shape.

8. The flanged modular plain bearing of claim 1, wherein the bearing extender has a taper or a step.

9. The flanged modular plain bearing of claim 1, wherein the plurality of first fingers and the plurality of second fingers are evenly spaced around the bearing wall.

10. The flanged modular plain bearing of claim 1, wherein the plurality of first fingers and the plurality of second fingers are unevenly spaced around the bearing wall.

11. The flanged modular plain bearing of claim 1, wherein the first end portion and the second end portion are formed from a polymer.

12. The flanged modular plain bearing of claim 11, wherein the first end portion and the second end portion are formed by injection molding.

13. The flanged modular plain bearing of claim 1, wherein the first end portion, the second end portion, and the bearing extender are formed by injection molding a polymer.

14. The flanged modular plain bearing of claim 1, wherein at least one of the first end portion, second end portion, and bearing extender are formed from a first material different from the others.

15. The flanged modular plain bearing of claim 1, wherein the second end portion further comprises a radially extending flange at said first end.

16. The flanged modular plain bearing of claim 1, wherein the second end portion further comprises a terminal wall.

17. The flanged modular plain bearing of claim 1, wherein the first and second fingers of the first and second end portions and the first and second connector fingers extend along the longitudinal axis, such that when the first and second end portions and the one or more bearing extenders are pushed together during assembly, the first and second fingers of the first and second end portions and the first and second connector fingers are flexed and move over one another in a transverse direction to cooperatively engage in a snap fit.

* * * * *